United States Patent [19]

Sezai

[11] Patent Number: 5,268,697
[45] Date of Patent: Dec. 7, 1993

[54] PROCESSING METHOD FOR ANTENNA PATTERN

[75] Inventor: Toshihiro Sezai, Tokyo, Japan

[73] Assignee: National Space Development Agency of Japan, Tokyo, Japan

[21] Appl. No.: 955,994

[22] Filed: Oct. 2, 1992

[30] Foreign Application Priority Data

Oct. 24, 1991 [JP] Japan ................................ 3-303756

[51] Int. Cl.$^5$ ............................................. G01S 5/02
[52] U.S. Cl. ................................. 342/427; 342/149
[58] Field of Search ...................... 342/427, 373, 149

[56] References Cited

U.S. PATENT DOCUMENTS 4,334,224  6/1982  Gordon .
4,599,622  7/1986  Haupt ................................. 343/427
5,017,929  5/1991  Tsuda ................................. 342/427

Primary Examiner—Theodore M. Blum
Attorney, Agent, or Firm—Armstrong, Westerman, Hattori, McLeland & Naughton

[57] ABSTRACT

After each received signal in the same two antennas of the monopulse power feed system are inputted into a hybrid circuit, a sum signal $\Sigma$ and a difference signal $\Delta$ are formed, and they are demodulated in detection circuits, zero is outputted if the value of the sum signal $\Sigma$ is equal to or smaller than the value of the difference signal $\Delta$, otherwise the value subtracted the difference signal $\Delta$ from the sum signal $\Sigma$ outputted, in a signal processing section. Thus, beam compression and reduction of a side lobe are performed.

4 Claims, 7 Drawing Sheets

PROCESSING METHOD FOR ANTENNA PATTERN

BACKGROUND OF THE INVENTION

The present invention relates to a processing method of antenna patterns allowing beam width of the antenna patterns to be compressed and a side lobe to be reduced, in an antenna apparatus of monopulse power feed system.

Generally, there are beam width and a side lobe for indices to represent the efficiency of antenna patterns, and the smaller the beam width is or the smaller the side lobe is, the better the performance as antenna patterns is, and it is not only applied to antennas for receiving.

However, there is an opposed relationship between the beam width and the side lobe, and the beam width is inverse proportion to the size (length) of antenna. That is, when the size of antenna is constant, the side lobe will be larger if the beam width is tried to set smaller, and the beam width will be larger if the side lobe is tried to set smaller. When it is allowed to change the size of antenna, the antenna will be larger if the beam width is tried to set smaller, and the beam width will be larger if the antenna is tried to make smaller.

Therefore, for example, in a rader antenna, in the relationship of beam width and a side lobe, resolution capability become worse, identification capability for objects is declined, and many objects might be mistaken for one object, because the beam width is widened when the side lobe is made smaller. Conversely, when the beam width is made smaller, the side lobe is large, therfore, when there is an object to the direction of the side lobe, the wrong judgement that there is an object to the direction for observation might be done, even if there is no object to it. Moreover, in the relationship of the beam width and the size of antenna, when the beam width is made half and the identification level is made twice, the size of antenna will be twice. If the size of it is twice, not only the occupied region of the antenna is larger, but also various bad effects occur such as the increase of the weight of antenna and the enlargement tendency of antenna support structure. Conversely, when the size of the antenna is made half, the beam width is widened twice, and the identification level is worse and half.

Thus, the beam width and the side lobe having an opposite nature, it is impossible to optimize both of them together, so the beam width and the side lobe are made a compromise in a certain degree, considering a distribution for minimizing the beam width under a condition of a certain side lobe, or one for minimizing the side lobe under that of a certain beam width, such as Chebyshev distribution. The beam width and the size of antenna having an opposite nature as described, as practical antennas almost have restriction such as the region occupied by antennas, the beam width is made a compromise in a certain degree in the actual situation.

In order to improve these problems partly, conventionally, it is known that the beam compression method for narrowing the beam width by subtracting a difference signal pattern of each received signal from a sum signal pattern of each received signal from the same two antennas of monopulse power feed system. FIG. 1 is an antenna apparatus such like that performing the beam compression, numerals 101,101 denote antennas of monopulse power feed system with length a and distance d between their centers made equal to the length a, numeral 102 denotes a hybrid circuit (HYB) for forming a sum signal Σ and a difference signal Δ for each received signal in the two antennas 101,101, numeral 103 denotes detection circuits for detecting the sum signal Σ and the difference signal Δ, and numeral 104 denotes a differential amplifier for outputting an antenna output signal after subtracting the difference signal Δ from the sum signal Σ.

FIG. 2 and FIG. 3 illustrate the result of simulation in the case of using horn antennas with length a about 25.7 times as long as the received wavelength as the antennas 101, 101, and the figures illustrate field patterns (FIG. 2) and power patterns (FIG. 3) normalized on the basis of the value in the direction where the angle is at zero degree, while the aperture surface distribution of the antennas is assumed to be uniform distribution. In these figures for patterns, broken lines show the sum signal Σ and solid lines show output patterns; from these patterns, it is understood the beam compression is performed.

According to the conventional beam compression method as desribed, the sum signal patterns of the original antenna patterns are given the beam compression, however, large side lobes are generated in output patterns as understood in FIG. 2 and FIG. 3. That is, in a near point where the value of the sum signal Σ takes zero for the first time, the value of the difference signal a shows a maximum value, then the value subtracted the value of the difference signal Δ from that of the sum signal Σ is given negative as shown in FIG. 2, but the value b is much larger than the size c of the side lobe of the sum signal pattern. Therefore, in some conventional beam compression methods, a side lobe is enlarged in the point where the difference signal Δ is larger than the sum signal Σ, consequently, although the beam compression can be made, the side lobe will be terribly larger than desired.

SUMAARY OF THE INVENTION

The present invention has been accompliched in order to solve the problems in the conventional beam compression methods as described, and the present invention is intended to provide the processing method of antenna patterns allowing the beam of antenna patterns to be compressed and the side lobe to be reduced.

In order to achieve the object as described, in the present invention, in a proceesing method of antenna patterns for using the same two antennas of monopulse power feed system to receive a radio wave, and giving a signal subtracted a difference signal Δ of each received signal of each antenna from a sum signal Σ of each received signal of each antenna to the final antenna output signal, antenna outuputs are processed to given zero if said sum signal Σ is equal to or smaller than the difference signal Δ.

In a processing method of antenna patterns such like this, first, beam width is reduced by giving the value subtracted a difference signal Δ from a sum signal Σ as output. Further a side lobe is reduced by outputting zero if the sum signal Σ is equal to or smaller than the difference signal Δ. That is, as the side lobe becomes larger in a part where the difference signal Δ is larger than the sum signal Σ, the side lobe will be made smaller if the output in the part is given zero. Therefore it is possible to compress beam and reduce the side lobe.

DETAILED DESCRIPTION

Figure 1:
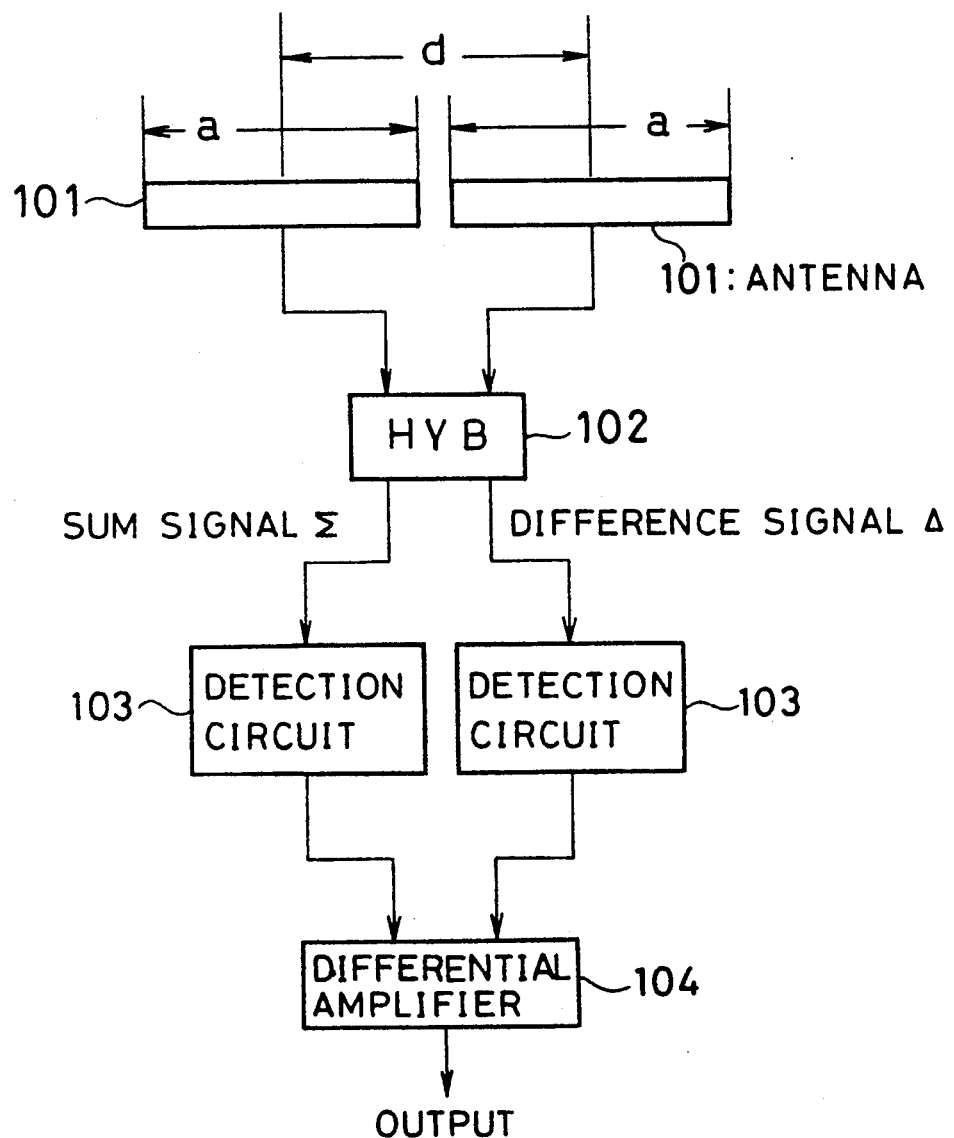
FIG. 1 is a schematic block diagram of a conventional antenna apparatus of the monopulse power feed system for performing beam compression.
Figure 2:
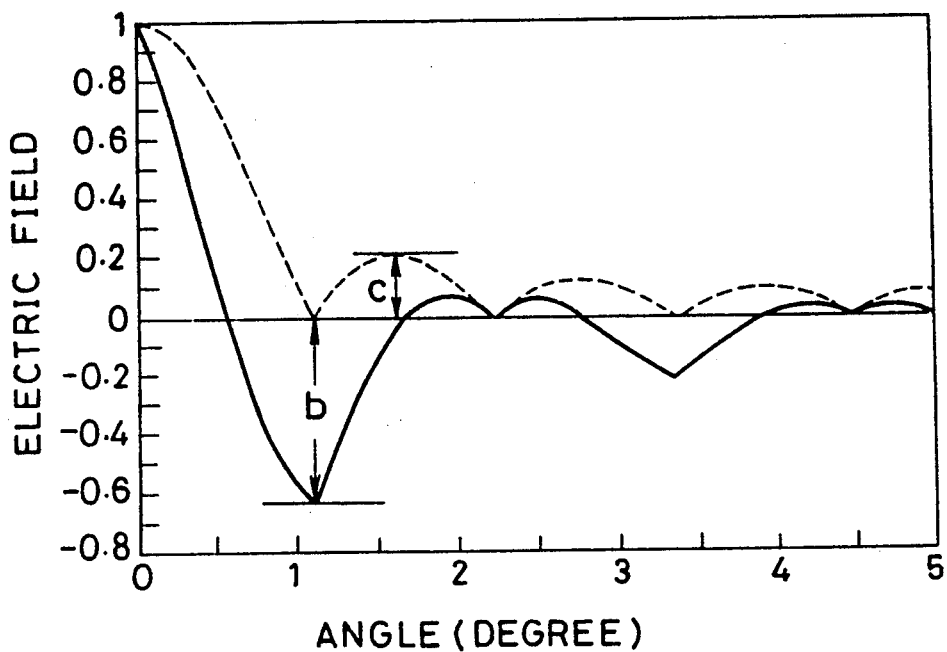
FIG. 2 illustrates field patterns of output signals from the antenna apparatus shown in FIG. 1.
Figure 3:
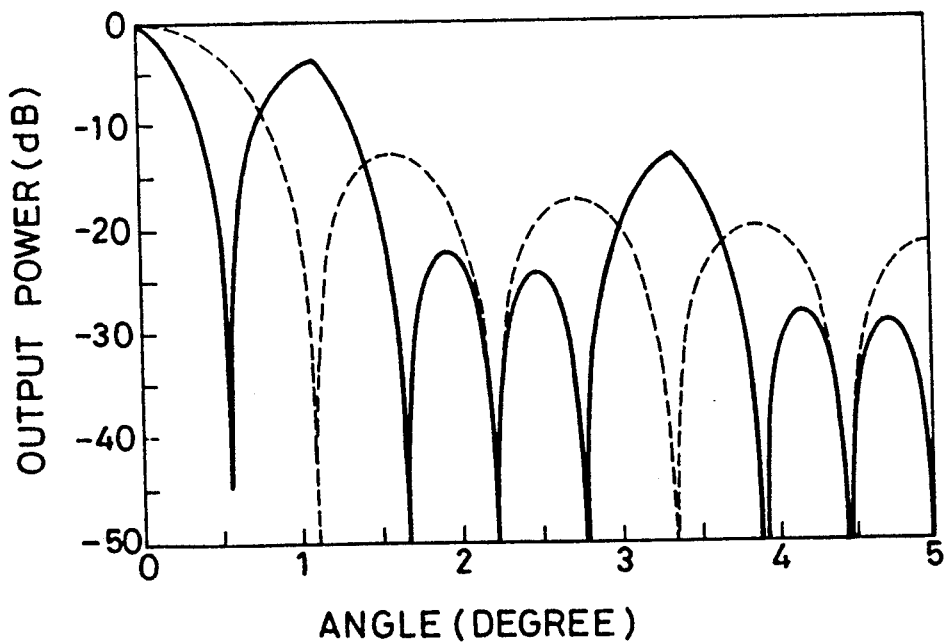
FIG. 3 illustrates power patterns of output signals from the antenna apparatus shown in FIG. 1.
Figure 4:
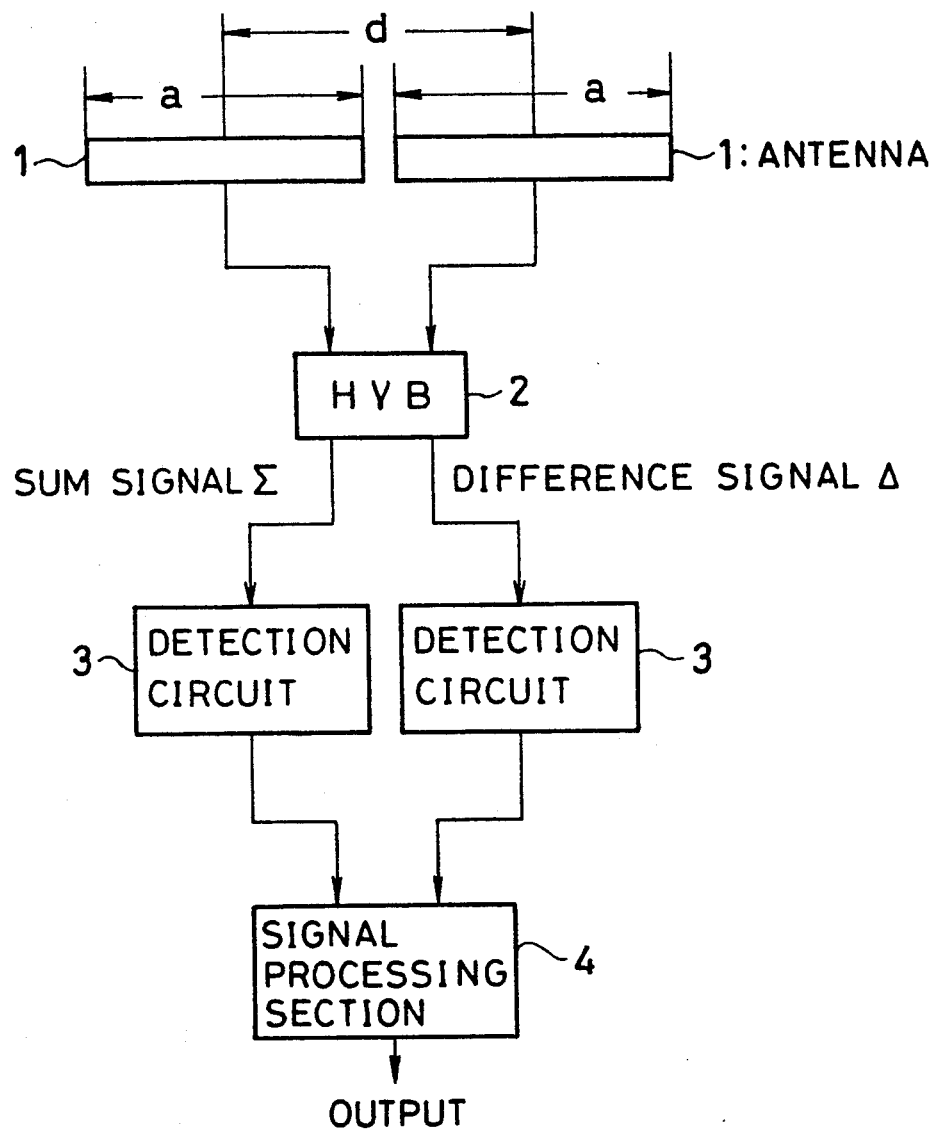
FIG. 4 is a schematic block diagram of antenna apparatus for describing an embodiment for a processing method of antenna patterns relating to the present invention.

An embodiment of the present invention will be described hereinunder. FIG. 4 illustrates a schematic block diagram of the antenna apparatus to describe an embodiment of the processing method of the antenna pattern relating to the present invention. In the figure, numerals 1,1 denote two receiving antennas having the same structure of monopulse power feed system with length a and distance d between their centers, using such as horn antennas and array antennas and composing an antenna system with these two antennas 1,1. Numeral 2 denotes a hybrid circuit(HYB), which forms a sum signal $\Sigma$ and a difference signal $\Delta$ of the received signals from the two antennas 1,1. Numerals 3,3 denote detection circuits. Numeral 4 denotes a signal processing section, and it is composed to output the value subtracted the value of the difference signal $\Delta$ from that of the sum signal $\Sigma$ if the value of the sum signal $\Sigma$ is larger than that of the difference signal $\Delta$, and output zero if the value of the sum signal $\Sigma$ is equal to or smaller than that of the difference signal $\Delta$.

After radio waves arrive at the antenna apparatus composed such like that, the hybrid circuit 2 inputted the received signals from the antennas 1,1 outputs the sum signal $\Sigma$ corresponding with a sum signal pattern and the difference signal $\Delta$ corresponding with a difference signal pattern. The outputs corresponding with the pattern made beam width compressed and a side lobe reduced can be obtained by peforming signal processing in the signal processing section 4 after demodulating those outputs with the detection circuits 3,3.

Figure 5A:
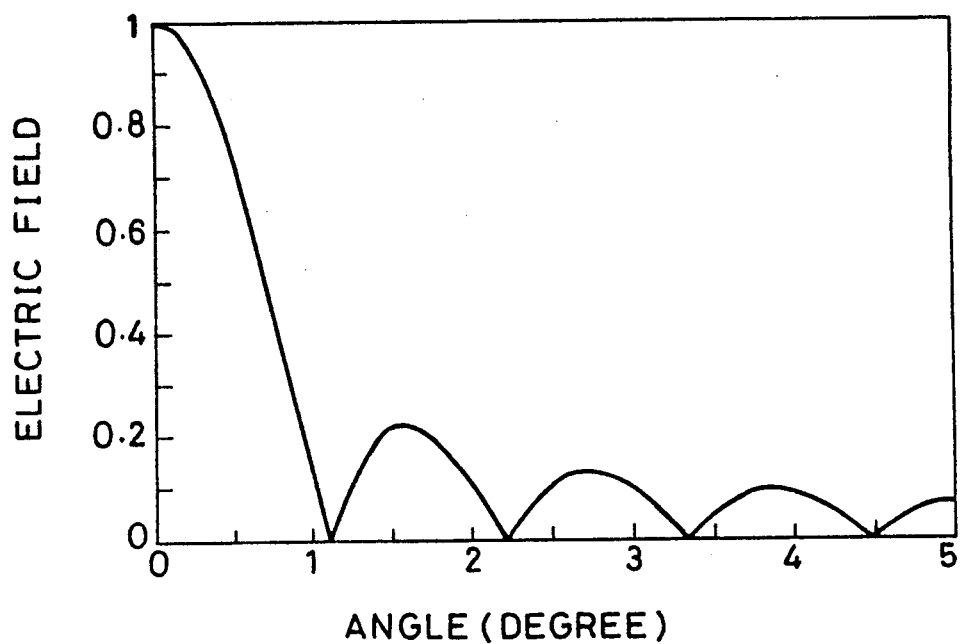
FIG. 5A and 5B illustrate a sum signal pattern and a difference signal pattern obtained in an antenna apparatus shown in FIG. 4.
Figure 5B:
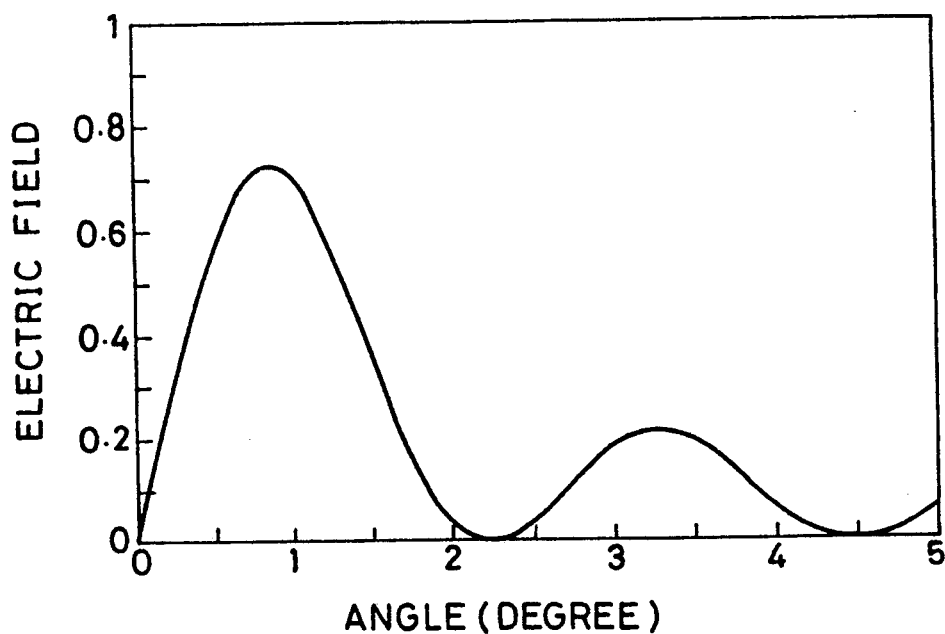
Figure 6A:
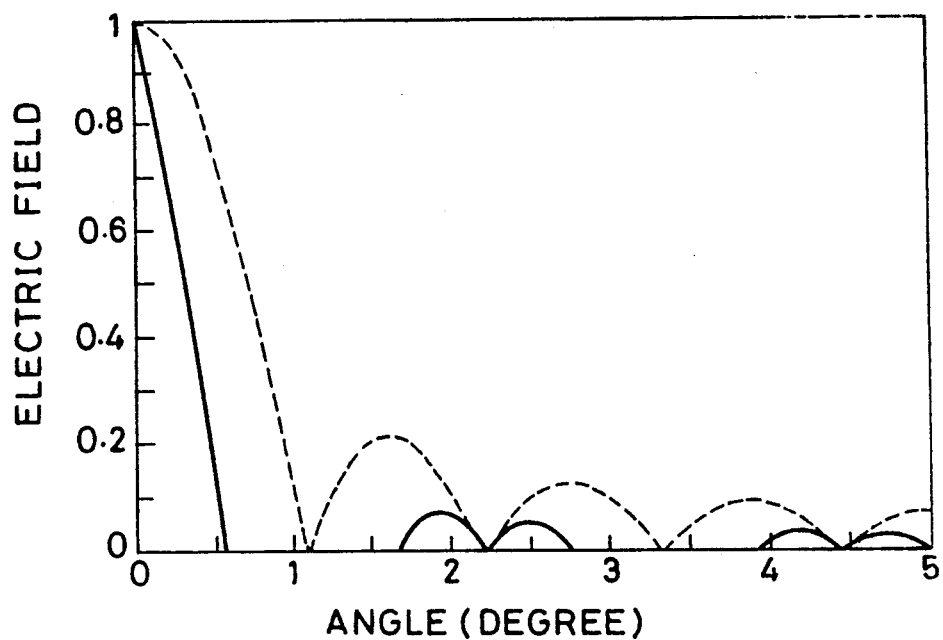
FIG. 6A and 6B illustrate field patterns and power patterns of output signals obtained in an antenna apparatus shown in FIG. 4.
Figure 6B:
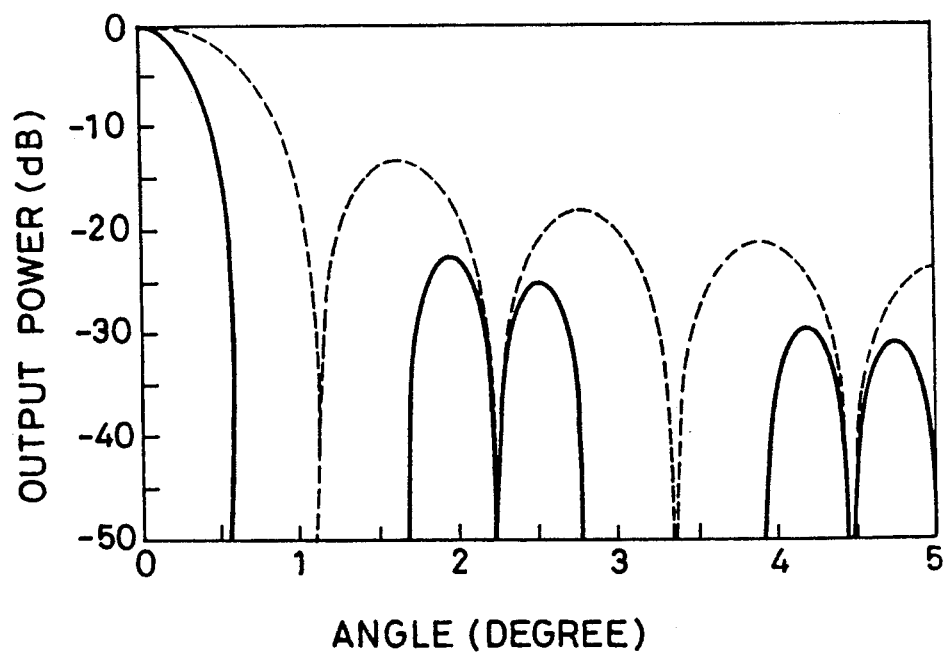

FIG. 5A and 5B and FIG. 6A and 6B illustrate results of the simulations in the case of making the distance d between the centers of the antennas 1,1 the same value equal to the length a, by using horn antennas set its length about 27.5 times as long as the wavelength of the received radio waves as antennas 1,1 in the antenna apparatus shown in FIG. 4. In this case, the aperture surface distribution of the antennas is assumed to be uniform distribution, then these figures illustrate field patterns and power patterns normalized on the basis of the value in the direction where angle is at zero degree. FIG. 5A illustrates a sum signal field pattern; FIG. 5B illustrates a difference signal field pattern; In FIG. 6A, broken lines show a sum signal field pattern, and solid lines show an output field pattern made beam compression performed and a side lobe reduced; FIG. 6B illustrates power patterns shown them with power. It is found that the pattern made the side lobe reduced and the beam compressed into almost half can be obtained from these patterns.

Figure 7:
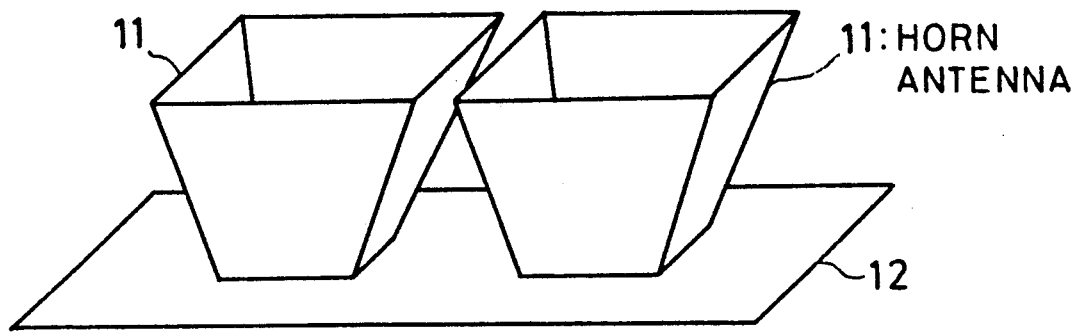
FIG. 7 illustrates a perspective view of an concrete constitutional embodiment of an antenna system of the antenna apparatus shown in FIG. 4.
Figure 8:
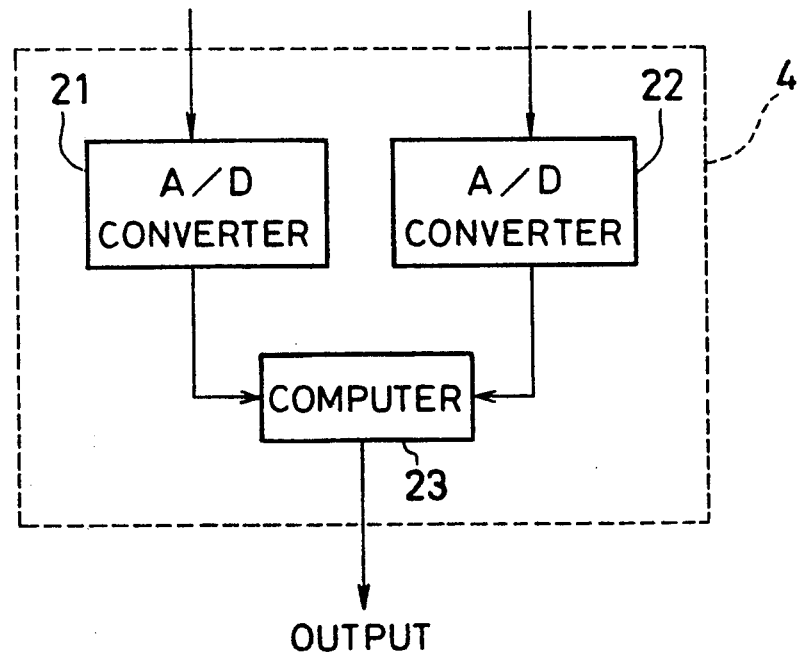
FIG. 8 is a circuit diagram of a concrete constitutional embodiment of a signal processing section.

FIG. 7 illustrates an concrete constitutional embodiment of the antenna system of the antenna apparatus. In this constitutional embodiment, the antenna system is composed of the horn antennas 11,11 with the same constituion, and numeral 12 denotes a supporting plate of the antennas.

In the case of performing analogical processing, the signal processing section can be composed with a general comparator and a differential circuit. In the case of performing digital processing, it can be composed with known technical means such as a means for performing comparison and subtraction method to the output signals from a detection circuits after converting them into digital signals with A/D converters, and one of the embodiment is shown in FIG .8. In the figure, Numerals 21,22 are A/D converters for converting an analogical sum signal $\Sigma$ and an analogical difference signal $\Delta$ demodulated in the detection circuits into digital signals; numeral 23 denotes a computer composed in order to compare a sum signal $\Sigma$ with a difference signal $\Delta$ in their values and output the value subtracted the value of the difference signal $\Delta$ from that of sum signal $\Sigma$, or zero.

In the signal processing section composed like this, first,an analogical sum signal $\Sigma$ and an analogical difference signal $\Delta$ demodulated in the detection circuits each are inputted into the A/D converters 21,22 and converted into digital values. Second, the digital signals are inputted into the computer 23, then it compares a sum signal $\Sigma$ with a difference signal $\Delta$ in their values and it works in order to output zero if the value of the sum signal $\Sigma$ is equal to or smaller than that of the difference signal $\Delta$,otherwise output the value subtracted the difference signal $\Delta$ from the sum signal $\Sigma$.

Figure 9:
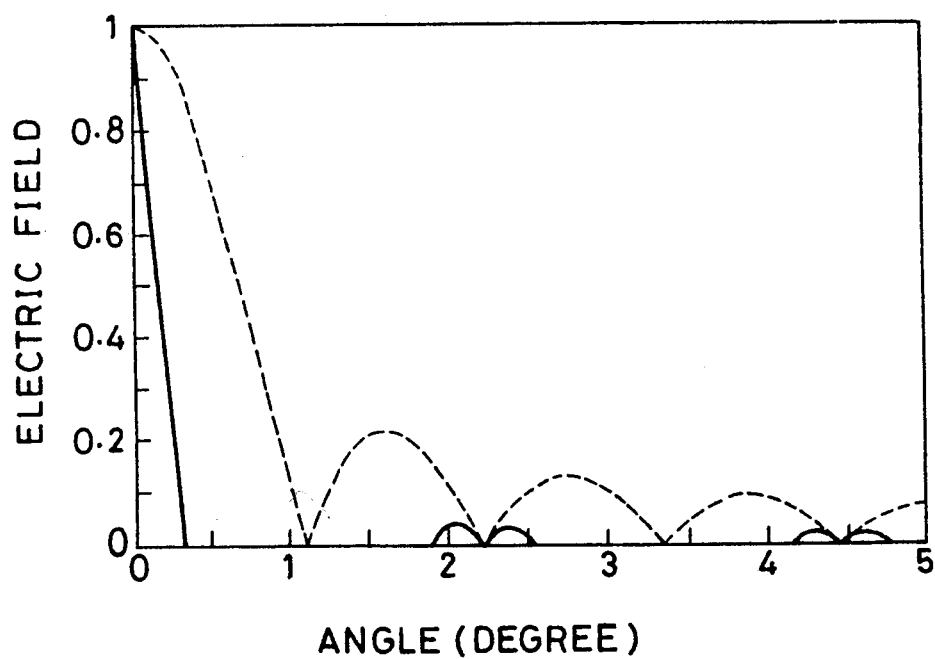
FIG. 9 illustrates output signal patterns processed with a correction difference signal given the value of a difference signal $\Delta$ twice.

In the embodiment as described, beam can be still compressed and a side lobe can be also reduced more by giving the correction signal multiplied the difference signal $\Delta$ by a coefficient larger than one to a new difference signal $\Delta$ and performing the same processing. That is, in principle,antenna patterns approaching delta function can be realized,because beam width is allowed to make small limitlessly and a side lobe is allowed to make small limitlessly by adopting larger coeffident for multiplying the value of the difference signal $\Delta$. As an embodiment for that, FIG. 9 illustrates a result of the simulation when a correction difference signal made the value of the difference signal $\Delta$ twice is processed as a new difference signal $\Delta$. Further, the constitution of antenna system in this case is the same as the case of the result of the simulation shown in FIG. 5A and 5B and FIG. 6A and 6B. In FIG. 9, broken lines show a sum signal pattern, and solid lines show an output pattern which beam is compressed more and a side lobe is reduced more.

As described above based on the embodiments, beam compression and the reduction of a side lobe can be realized, according to the present invention. Moreover, beam can be compressed more, and a side lobe can be reduced more, by giving a correction difference signal multiplied a difference signal $\Delta$ by a coefficient larger than one to a new difference signal $\Delta$ according to the present invention.

What is claimed is:

1. A processing method of antenna patterns which make use of the same two antennas of a monopulse power feed system to receive a radio wave, comprising the steps of:

processing and thereafter outputting, as antenna final output signal, a resulting signal which results from a subtraction of a difference signal of each received signal of each antenna from a sum signal of each received signal of each antenna, wherein said antenna final output signal comprises said resulting signal to compress beam width of said antenna patterns; and processing and thereafter outputting, when a value of said sum signal is equal to or smaller than that of said difference signal, a zero signal as said antenna final output signal to reduce a side lobe.

2. The processing method of antenna patterns as in claim 1, further comprising the step of converting the difference and sum signals to digital signals prior to processing.

3. A processing method of antenna patterns for using the same two antennas of a monopulse power feed system to receive a radio wave, comprising the steps of:

processing and thereafter outputting as antenna final output signal, a resulting signal which results from a substraction of a difference signal of each received signal of each antenna from a sum signal of each received signal of each antenna, wherein said antenna final output signal comprises said resulting signal to compress beam width of said antenna patterns;

generating a correction difference signal by multiplying said difference signal by a coefficient larger than one; and processing and thereafter outputting during a subtraction of said correction difference signal from said sum signal and when a value of said sum signal is equal to or smaller than that of said correction difference signal, a zero signal as said antenna final output signal to reduce a side lobe.

4. The processing method of antenna patterns as in claim 3, further comprising the step of converting the difference and sum signals to digital signals prior to processing.

* * * * *